(12) United States Patent
Stroila et al.

(10) Patent No.: US 9,476,705 B2
(45) Date of Patent: Oct. 25, 2016

(54) DETERMINING TRAVEL PATH FEATURES BASED ON RETROREFLECTIVITY

(71) Applicant: Navteq B.V., Veldhoven (NL)

(72) Inventors: Matei Nicolai Stroila, Chicago, IL (US); Xin Chen, Evanston, IL (US); Mahsa Kamali Moghaddam, Saugus, MA (US); Victor Lu, Urbana, IL (US); Bradley Dean Kohlmeyer, Lisle, IL (US)

(73) Assignee: HERE Global B. V., Eindhoven (NL)

( * ) Notice: Subject to any disclaimer, the term of this patent is extended or adjusted under 35 U.S.C. 154(b) by 92 days.

(21) Appl. No.: 14/192,086

(22) Filed: Feb. 27, 2014

(65) Prior Publication Data

US 2014/0180590 A1  Jun. 26, 2014

Related U.S. Application Data

(63) Continuation of application No. 12/389,553, filed on Feb. 20, 2009, now Pat. No. 8,699,755.

(51) Int. Cl.
  *G01C 3/06* (2006.01)
  *G01S 17/89* (2006.01)
  *G09B 29/00* (2006.01)

(52) U.S. Cl.
  CPC ............... *G01C 3/06* (2013.01); *G01S 17/89* (2013.01); *G09B 29/008* (2013.01)

(58) Field of Classification Search
  None
  See application file for complete search history.

(56) References Cited

U.S. PATENT DOCUMENTS

| | | | |
|---|---|---|---|
| 5,054,094 A * | 10/1991 | Barski | G06K 9/46 382/192 |
| 5,358,466 A * | 10/1994 | Aida | A61B 17/2256 600/439 |
| 5,703,691 A * | 12/1997 | Klaras | G01N 21/39 356/236 |
| 6,226,007 B1 | 5/2001 | Brown | |
| 6,246,332 B1 * | 6/2001 | Hubbard | G01R 19/2513 340/635 |

(Continued)

FOREIGN PATENT DOCUMENTS

| | | |
|---|---|---|
| WO | WO2008044914 | 4/2008 |
| WO | WO2008048088 | 4/2008 |
| WO | WO2008054203 | 5/2008 |

OTHER PUBLICATIONS

Takagi, Kiyokazu, Katsuhiro Morikawa, Takashi Ogawa, and Makoto Saburi. "Road environment recognition using on-vehicle LIDAR." In Intelligent Vehicles Symposium, 2006 IEEE, pp. 120-125. IEEE, 2006.*

(Continued)

*Primary Examiner* — Michelle Entezari
(74) *Attorney, Agent, or Firm* — Lempia Summerfield Katz LLC

(57) ABSTRACT

Systems, devices, features, and methods for determining geographic features corresponding to a travel path to develop a map database, such as a navigation database, are disclosed. For example, one method comprises emitting light from a light source, such as a LIDAR device, while on the travel path. Returning light is received based on the emitted light. The returning light is used to generate data points representing an area about the travel path. The data points are filtered as a function of a return intensity value to identify a feature associated with the travel path, in which the feature is treated with a retroreflective substance.

20 Claims, 9 Drawing Sheets

(56) References Cited

U.S. PATENT DOCUMENTS

| | | | |
|---|---|---|---|
| 6,266,442 B1 | 7/2001 | Laumeyer et al. | |
| 6,288,721 B1 | 9/2001 | Donoghue et al. | |
| 6,674,878 B2 | 1/2004 | Retterath et al. | |
| 6,775,396 B2 | 8/2004 | Matsunaga | |
| 6,891,960 B2 | 5/2005 | Retterath et al. | |
| 6,963,657 B1* | 11/2005 | Nishigaki | G01S 11/12 340/901 |
| 6,985,609 B2 | 1/2006 | Shibuya | |
| 7,124,027 B1 | 10/2006 | Ernst, Jr. et al. | |
| 7,312,744 B1 | 12/2007 | Ramstack | |
| 7,330,112 B1* | 2/2008 | Emigh | B60R 25/1004 340/429 |
| 7,720,647 B2 | 5/2010 | Chang et al. | |
| 2001/0036293 A1 | 11/2001 | Laumeyer et al. | |
| 2002/0100884 A1* | 8/2002 | Maddock | G01N 21/251 250/559.29 |
| 2002/0158870 A1 | 10/2002 | Brunkhart et al. | |
| 2004/0175043 A1* | 9/2004 | Lee | G06K 9/3241 382/199 |
| 2004/0252864 A1 | 12/2004 | Chang et al. | |
| 2005/0228555 A1 | 10/2005 | Roh et al. | |
| 2005/0243301 A1* | 11/2005 | Takagi | 356/4.07 |
| 2005/0273264 A1 | 12/2005 | Gern et al. | |
| 2007/0255480 A1* | 11/2007 | Southall | B60T 7/22 701/96 |
| 2007/0291130 A1 | 12/2007 | Broggi et al. | |
| 2008/0043035 A1 | 2/2008 | Chang et al. | |
| 2008/0075367 A1* | 3/2008 | Winn | G06K 9/4638 382/180 |
| 2008/0106436 A1* | 5/2008 | Breed | B60N 2/2863 340/905 |
| 2008/0166023 A1 | 7/2008 | Wang | |
| 2008/0186210 A1* | 8/2008 | Tseng | G01C 21/3602 340/995.26 |
| 2008/0205717 A1* | 8/2008 | Reeves | G06T 7/0012 382/128 |
| 2008/0240573 A1* | 10/2008 | Nakamura | G01C 21/26 382/190 |
| 2009/0041337 A1* | 2/2009 | Nakano | G06K 9/00798 382/154 |
| 2009/0046289 A1* | 2/2009 | Caldwell | F03D 7/02 356/341 |
| 2009/0051926 A1 | 2/2009 | Chen | |
| 2009/0103773 A1 | 4/2009 | Wheeler et al. | |
| 2009/0129655 A1* | 5/2009 | Lossev | G06K 9/6297 382/132 |
| 2009/0202109 A1* | 8/2009 | Clar et al. | 382/104 |
| 2010/0002942 A1* | 1/2010 | Watson | 382/218 |
| 2010/0014713 A1 | 1/2010 | Zhang et al. | |
| 2010/0017115 A1* | 1/2010 | Gautama | G01C 21/28 701/533 |
| 2010/0026566 A1* | 2/2010 | Ueda | G01S 19/42 342/357.36 |
| 2010/0034422 A1* | 2/2010 | James et al. | 382/103 |
| 2010/0074473 A1 | 3/2010 | Kotaba | |
| 2010/0109938 A1 | 5/2010 | Oswald et al. | |
| 2010/0114416 A1 | 5/2010 | Au et al. | |
| 2010/0191459 A1* | 7/2010 | Carter | G01C 21/32 701/532 |
| 2010/0328644 A1* | 12/2010 | Lu et al. | 356/5.01 |
| 2011/0098892 A1 | 4/2011 | Lundmark et al. | |

OTHER PUBLICATIONS

Alharthy et al. "Automated Road Extraction from LIDAR Data", ASPRS 2003 Annual Conference Proceedings, Anchorage, Alaska, pp. 1-10, May 2003.

Belongie et al., "Shape Matching and Object Recognition Using Shape Contexts", IEEE Transactions on Pattern Analysis and Machine Intelligence, vol. 24, No. 24, pp. 509-522, Apr. 2002, http://www.cs.berkeley.edu/~malik/papers/BMP-shape.pdf.

Bernardi et al., "The Ball-Pivoting Algorithm for Surface Reconstruction", IEEE Transactions on Visualization and Computer Graphics, 5(4), Oct.-Dec. 1999, pp. 349-359, http://www.research.ibm.com/vistechnology/pdf/bpa_tvcg.pdf.

Extended European Search Report, pp. 1-5, Aug. 2, 2010.

Kremer et al., "Performance of the StreetMapper Mobile LIDAR Mapping System in 'Real World' Projects" pp. 215-225, Jan. 30, 2008, http://www.ifp.uni-stuttgart.de/publications/phowo07/240Kremer.pdf.

Lalonde et al., "Data Structures for Efficient Dynamic Processing in 3-D", The International Journal of Robotics Research, vol. 26, No. 8, 2007, pp. 777-796, http://www.cs.cmu.edu/%7Evandapel/publications/publi_rep/07_ijrr_cta_preprint.pdf.

Rabbani, T. et al., "Segmentation pf Point Clouds Using Smoothness Constraint", IAPRS, vol. XXXVI, part 5, pp. 248-253, Dresden 25-27, Sep. 2006, http://www.isprs.orgicommission5/proceedings06/paper/RABB_639.pdf.

Song et al., "Assessing the Possibility of Land-Cover Classification Using LIDAR Intensity Data", Remote Sensing and Spatial Information Science: vol. 34, pp. 259-262, 2002.

* cited by examiner

DETERMINING TRAVEL PATH FEATURES BASED ON RETROREFLECTIVITY

This application is a continuation application under 37 C.F.R. §1.53(b) and 35 U.S.C. §120 of U.S. patent application Ser. No. 12/389,553 filed Feb. 20, 2009, the disclosure of which is incorporated herein by reference in its entirety

BACKGROUND OF THE INVENTION

The present invention relates to collecting and analyzing data and, more particularly, to determining geographic features corresponding to a travel path from collected data.

Generating and presenting real-world data models assist end users in a variety of experiences. For example, navigation systems or devices provide useful displays and visual guidance in instructing or guiding people to desired destinations. Navigation devices use map or geographic data, including navigation-related attributes, to provide features, such as map display and map guidance. Some or all of the geographic data may be provided and/or generated from collected information.

However, collection and processing procedures to provide geographic data for use in navigation systems may be a significant undertaking. For example, collection of data about the roads in a geographic area and developing useful geographic data for navigation devices may be time consuming and/or intricate. Accordingly, systems, methods, and/or techniques to assist, aid, and/or expedite developing geographic data, such as for use in a navigation device or other map or location-based service devices or databases, are useful.

SUMMARY OF THE INVENTION

According to one aspect, a method for determining geographic features corresponding to a travel path to develop a map database is provided. For example, light from a light source is emitted while on the travel path. Returning light is received based on the emitted light. The returning light is used to generate data points representing an area about the travel path. The data points are filtered as a function of a return intensity value to identify a feature associated with the travel path, in which the feature is treated with a retroreflective substance.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
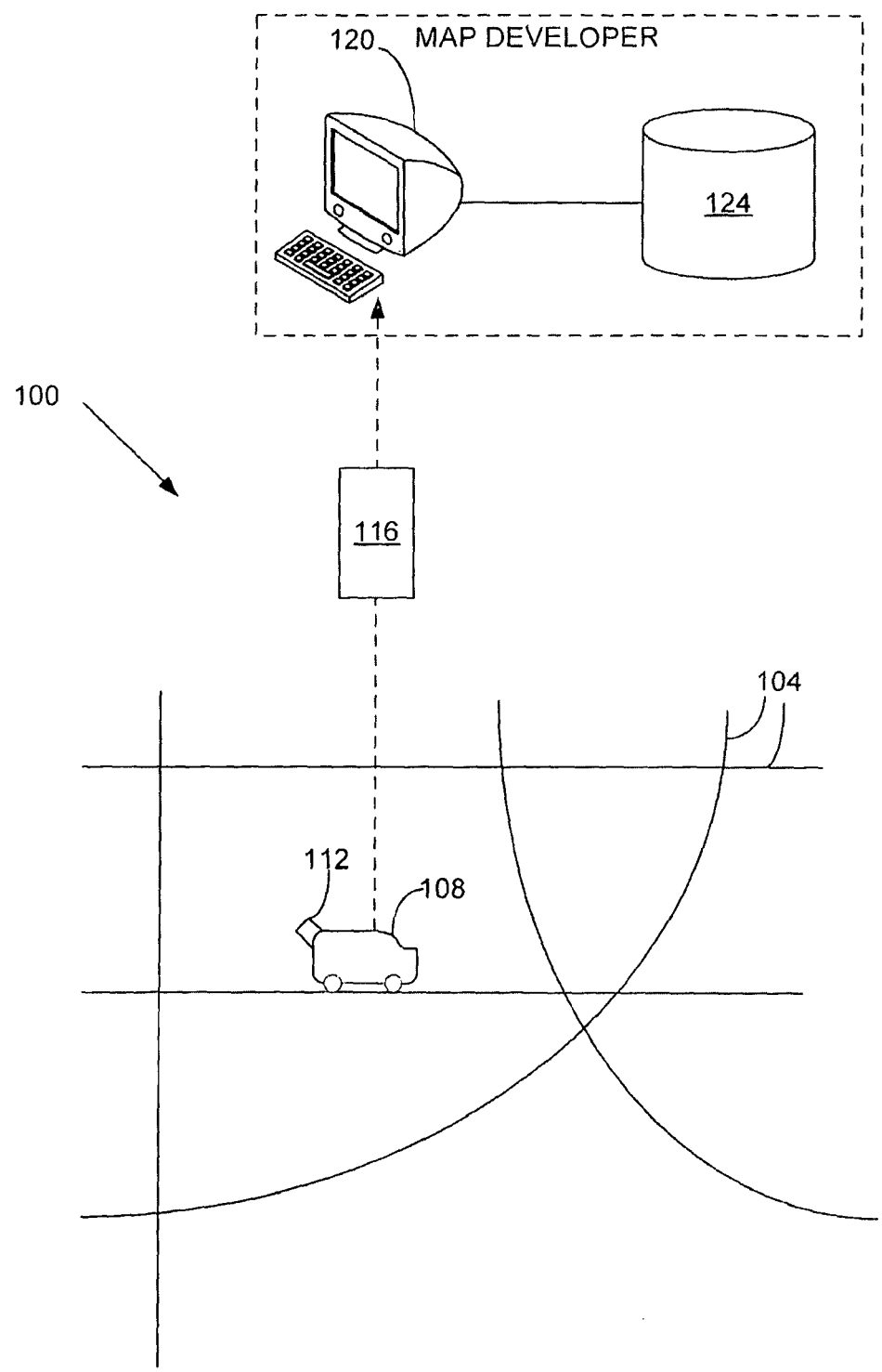
FIG. 1 is a diagram of a system for determining geographic features corresponding to a travel path to develop a map database.

FIG. 1 shows one embodiment of a system 100 for determining geographic features corresponding to a travel path to develop a map database. The system 100 includes, but is not limited to, an object 108 travelling on a path network 104, a processing device 120, and a geographic, map, navigation, and/or navigation-related database 124. Additional, fewer, or different components may be provided.

The object 108 is a vehicle, such as a car, truck, motorcycle, bicycle, Segway, or other transportation device or mechanical device used to move on the path network 104. Alternatively, the object 108 may represent a pedestrian, such as a human being or animal, that walks or moves along the path network 104. The path network 104 is a road network and/or a collection of other pathways. For example, the path network 104 is a road network made up of various roads. The roads may be used to drive vehicles on, such as local and neighborhood streets and highways. Also, instead of or in addition to traditional streets, the path network 104 may include bicycle roads or paths, walking paths, or other travel paths.

The object 108 travels along or moves about the path network 104 to collect data associated with one or more paths or roads of the path network 104. For example, a supporting device or housing 112 is attached or connected with or carried by the object 108. The supporting device 112 may be or may include equipment to collect data representing an area about or around a road or path. The collected data may be imagery or video/camera data (such as in the visible spectrum), position data, laser/light data, and/or other forms of data. For example, the supporting device 112 is a housing or container that is attached to a vehicle, and as the vehicle is on and/or moving on a road, equipment in the supporting device 112 collects or gathers data corresponding to the surrounding area. The supporting device 112 may be positioned at a backend of the vehicle and may be angled to enhance collection. Alternatively, the supporting device 112 may be positioned any place on the vehicle and in any direction.

The collected data is stored on one or more computer-readable media 116, such as a CD-ROM, DVD, flash drive, hard drive, or other tangible media suitable to store data. Different types of data may be stored on the same medium 116. For example, collected video or camera data and collected laser or light data may be stored on the same medium 116. Alternatively, separate media 116 may be used to store separate or different types of data (such as a medium 116 for laser or light data and another medium 116 for video data).

The collected data, via one or more media 116, is sent to a map, geographic, and/or navigation data developer, such as NAVTEQ North America, LLC located in Chicago, Ill. For example, a medium 116 may be mailed to or brought to the map developer. Alternatively, some or all of the collected data may be transmitted to the map developer via a wireless and/or wired network. For example, the network may include the Internet, an intranet, a local area network ("LAN"), a wide area network ("WAN"), a virtual private network ("VPN"), a cellular network, a satellite network, a broadcasting network, a wireless or wired connection, and/or any known or future network or connection. The term "map developer" may also include third-party contractors.

The processing device 120 maintained by the map developer receives the collected data, via the medium 116 or other means. The processing device 120 is one or more computers (such as a laptop or desktop), workstations, consoles, processors, or other electronic processing systems or devices. The processing device 120 uses some or all of the collected data to determine and/or identify geographic features corresponding to a road or path of the path network 104. In determining the geographic features, the processing device 120 determines locations, sizes, shapes, types, and/or other attributes of geographic features. The processing device 120 and/or associated device further generates data models corresponding to the geographic features. For example, the processing device 120 may identify data points corresponding to a road sign from the collected data. The processing device 120 then begins modeling the road sign by determining a mathematical shape corresponding to the identified data points. Other attributes such as color and text may also be added. A data model may then be stored in the geographic or navigation database 124.

In one embodiment, the geographic database 124 includes data used for navigation-related services. For example, the geographic database 124 contains road segment and node data records that represent a road network, such as the road network 104. A node represents an end point of a road segment. The road segments and nodes may be associated with attributes, such as geographic coordinates, street names, address ranges, speed limits, turn restrictions at intersections, and other vehicle navigation attributes, as well as points-of-interest ("POIs"), such as gasoline stations, hotels, restaurants, museums, stadiums, offices, automobile dealerships, auto repair shops, buildings, stores, etc. Alternatively, the geographic database 124 contains path segment and node data records that represent pedestrian paths in addition to or instead of the vehicle road record data.

The geographic database 124 may be a master geographic database that is stored in a format that facilitates updating, maintenance, and development. For example, the master geographic database 124 or data in the master geographic database 124 is in an Oracle spatial format, such as for development or production purposes. The Oracle spatial format or development/production database may be compiled into a delivery format, such as a GDF format. The data in the production and/or delivery formats may be compiled or further compiled to form geographic database products or databases, which may be used in navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation.

When storing the data models generated by the processing device 120 and/or associated device, the data models may be associated with specific road or path segment records. For example, the data model representing the road sign may be stored in or linked with the road segment record associated with the actual portion of the real-world road. Accordingly, when data corresponding to the road segment record is accessed, such as by a navigation system or device, the data model of the road sign may be used for 2D, 3D, or 4D display or other navigation related purposes or location based services.

Figure 2:
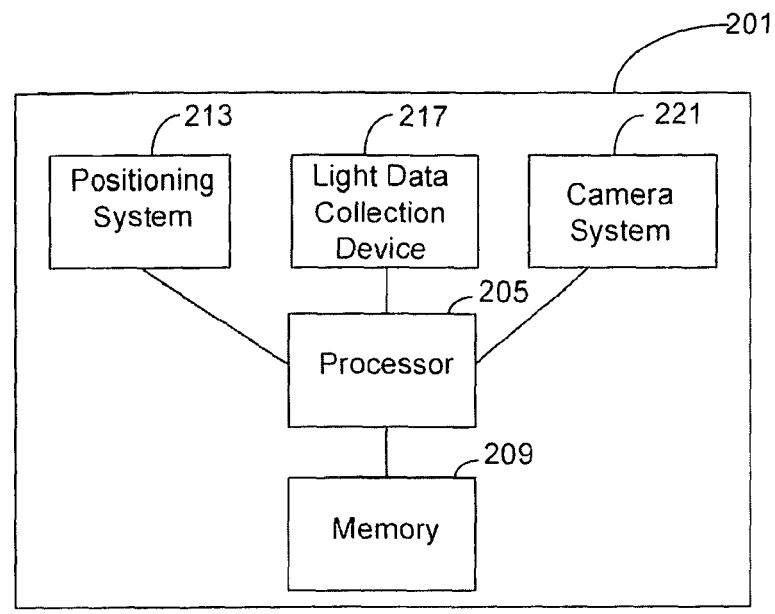
FIG. 2 illustrates components of a device that may be used in the system of FIG. 1.

FIG. 2 illustrates components of a device 201 used in the system 100. For example, the device 201 may be an embodiment of the object 108, such as a vehicle, or may be similar to the supporting device 112. In one embodiment, the device 201 is a support or housing that includes equipment to collect path data. For example, the device 201 is removably or integrally attached or connected to a vehicle. The device 201 is positioned at a top backend of the vehicle. Alternatively, the device 201 may be positioned on or in any part of the vehicle at any angle.

The device 201 includes, but is not limited to, a processor 205, a memory 209, a positioning system 213, a light data collection device 217, and a camera system 221. Additional, fewer, or different components may be provided. For example, an input device may be provided. The input device may be one or more buttons, keypad, keyboard, mouse, stylist pen, trackball, rocker switch, touch pad, voice recognition circuit, or other device or component for controlling or inputting data in one or more of the components of the device 201. While the components in FIG. 2 are shown as separate from one another, one or more of these components may be combined. Also, some of the components may be provided outside of the device 201. For example, if the device 201 is a housing attached to a vehicle, the positioning system 213, the processor 205, the memory 209, an input device, and/or other components may be in the vehicle or another part of the vehicle while the light data collection device 217 and the camera system 221 are in the device 201. The light data collection device 217 and the camera system 221 in the device 201 may also be separated into different enclosures or supports.

The processor 205 is a general processor, application-specific integrated circuit ("ASIC"), digital signal processor, field programmable gate array ("FPGA"), digital circuit, analog circuit, or combinations thereof. The processor 205 is one or more processors operable to control and/or communicate with the various electronics and logic of the device 201. The processor 205 is configured to operate the collection equipment, such as the positioning system 213, the light data collection device 217, and the camera system 221. For example, the processor 205 sends commands to the various collection devices to collect data and synchronizes or manages the different components. Also, the processor 205 is configured to store data from the collection devices into the memory 209.

The memory 209 is any known or future storage device. The memory 209 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 209 may be part of the processor 205. The memory 209 is operable or configured to store collected data. The memory 209 may be part of the computer-readable medium 116 or may be a separate memory.

The positioning system 213 is a global positioning satellite ("GPS") system, one or more mechanical and/or electrical sensors, one or more gyroscopes, a local positioning system, one or more direction sensors, or other system or device for providing position data, such as location data (e.g., longitude, latitude, and/or altitude) and/or direction data, of the device 201, components thereof, or an attached object, such as a vehicle.

The camera system 221 includes one or more cameras used for taking pictures or videos of a surrounding area. For example, the camera system 221 includes a video camera that records video data (such as in the visible light spectrum) representing geographic features of and about a road or path as a vehicle drives along the road or path. The camera system 221 may also capture still photographs separate from the video data. The camera system 221 is able to capture different colors and associated text of geographic features.

The light data collection device 217 includes a light source and a light receiver. For example, the light data collection 217 is a Light Detection and Ranging ("LIDAR") device or sensor, a laser device, and/or other device that collects data points by transmitting and receiving light. In one embodiment, the light data collection device 217 is a LIDAR device that uses one or more lasers to collect data points representing a surrounding area, such as an area about a road or path. The LIDAR device collects and gathers data points in a point cloud, such as a 3D point cloud, in which each data point corresponds to a local coordinate, such as (x, y, z). The one or more lasers may be in a near infrared spectrum (such as about 700 nm to about 5000 nm or about 800 nm to about 2500 nm) or other light spectrum. In one embodiment, the LIDAR device is a 64 element LIDAR sensor HDL-64E from Velodyne, Inc, located in Morgan Hill, Calif. and/or a LMS200 series LIDAR sensor from SICK AG, located in Waldkirch, Germany. For example, one SICK LIDAR sensor (which may rotate at about 180° may provide fewer data points but with lower noise) and one 64 element LIDAR sensor from Velodyne (which may rotate at about 360° may provide more dense data points but with noiser data) may be used.

Figure 3:
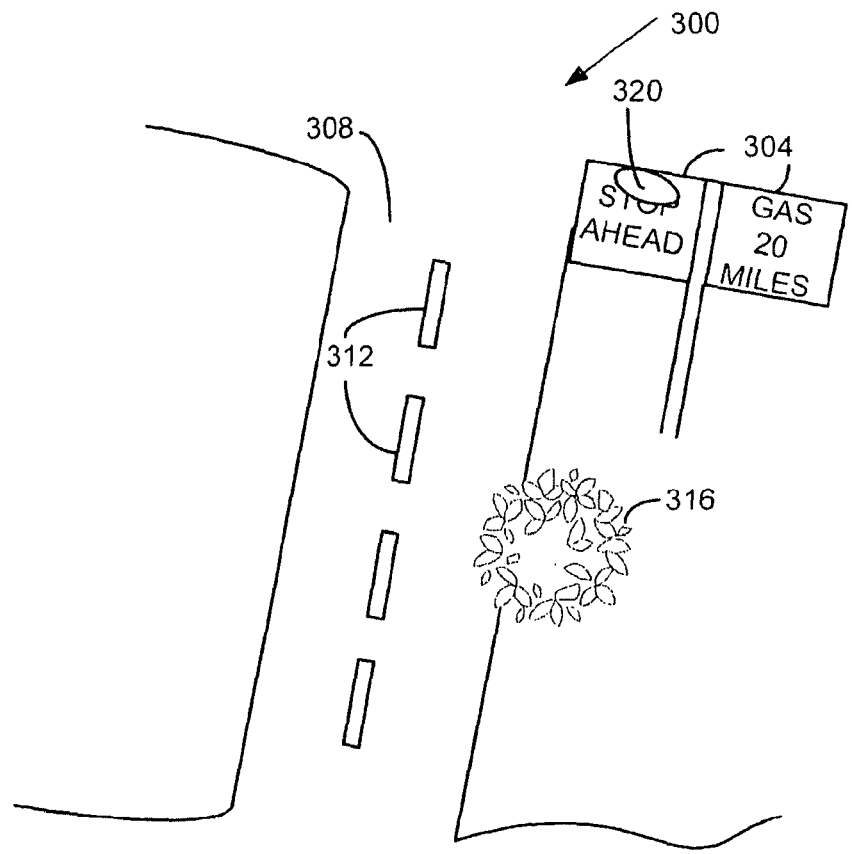
FIG. 3 is a diagram of geographic features in a real-world area.

FIG. 3 is a diagram of geographic features in a real-world area 300. For example, the real-world area 300 corresponds to a street or road area. The area 300 includes, but is not limited to, a road or street 308, lane markings 312, road signs 304, a bush or shrubbery 316, and dirt, mud, debris, or obstruction 320 (e.g., the mud or debris 320 may have been splattered on or come into contact with one of the road signs 304 by a passing vehicle or weather condition). Other geographic features may include other road signs, such as stop signs or traffic signs, side curbs, other road markings, sidewalks, crosswalks, or other traffic control devices or road or path features.

Some of the geographic features of the real-world area 300 are treated with a retroreflective substance. For example, the road signs 304 and the lane markings 312 are made of or include a retroreflective material. The road signs 304 may have retroreflective sheeting, and the lane markings 312 may be or include retroreflective paint. Unlike diffuse reflection and specular reflection, retroreflectivity is when light is reflected back in the direction that it came from.

To be able to see road or path signs, such as the road signs 304, and road or path markings, such as the lane markings 312, during a low ambient light period or night time, retroreflective substances are used to reflect light from headlights or other light sources back to motorists or pedestrians. For example, glass beads and/or microprismatic reflectors are used in paint or sheeting for road features to reflect light back in the direction it came from to see traffic control devices more easily at night or low light periods. Federal, state, and/or local governments maintain certain retroreflectivity standards for road signs, road markings, and other traffic control devices. For example, a road sign or road marking may be required to have a retroreflectivity of at least about 7, 15, 25, 35, 50, 75, 120, and/or 250 RA or candela per incident lux per square meter ("cd/lx/m$^2$") depending on what color or combination of colors are being used, such as on a road sign. Other retroreflectivity ratios may be used. Associated requirements and standards may be found in the Manual on Uniform Traffic Control Devices ("MUTCD") published by the Federal Highway Administration under 23 C.F.R. Part 655, Subpart F.

In one embodiment, the object 108, such as a vehicle, drives down or along the road 308. While on or driving on the road 308, data is collected corresponding to the real-world area 300. For example, the light data collection device 217 collects LIDAR data about the road 308. The LIDAR sensors or lasers within may rotate 180°, 360°, or at any other angle. The LIDAR sensors may also be tilted at an angle relative to the driving direction for better collection. LIDAR sensors emit laser light outwardly from to the top backend of the object 108, and returning light is received. The returning light is used to configure data points into a 3D point cloud. For example, each object in which light is bounced or reflected from is represented as a data point in a local (x, y, z) coordinate system (e.g., the position of the 3D data point is computed based on the light's time of flight).

Figure 4:
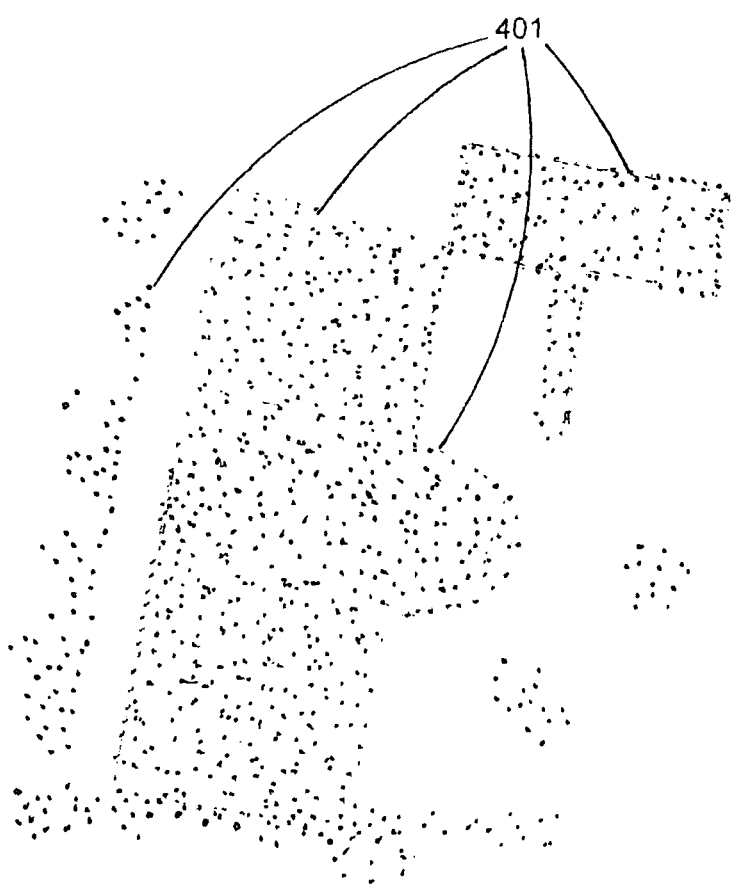
FIG. 4 illustrates an embodiment of collected data.

FIG. 4 illustrates an embodiment of data 401 collected from the light data collection device 217, such as LIDAR data. For example, the collected data 401 represents an area about or around the road 308. Each data point 401 has a (x, y, z) value in a local coordinate system. The data points 401 may be converted to a global coordinate system (such as in longitude, latitude, and altitude and/or a Universal Transverse Mercator ("UTM") system) based on collected real-world position information (such as the position information of the sensors). For visualization purposes, each data point 401 may be associated with a level of brightness based on distance or depth. For example, data points 401 that represent objects that were closer to the LIDAR sensor may be brighter than data points 401 that represent objects that were farther away from the LIDAR sensor. The brightness may be used to better visualize the 3D features of the collected data 401.

Each data point 401 also has or is associated with a return intensity value, I. For example, the return intensity value is based on the amount of light or energy returning to the LIDAR sensor based on emitted light. A return intensity value may range from about 0 to about 255 (e.g., the return intensity value may be represented by a number between 0 and 255). Other values may be used or provided. Data points 401 corresponding to geographic features, such as the road signs 304 and the lane markings 312, have higher return intensity values because the geographic features are treated with retroreflective substances, such as retroreflective paint or sheeting. A retroreflector reflects light substantially back in the direction from which it came. Accordingly, geographic features, such as road signs and road markings, may be determined from the collected data 401 as a function of return intensity value or retroreflectivity.

Figure 5:
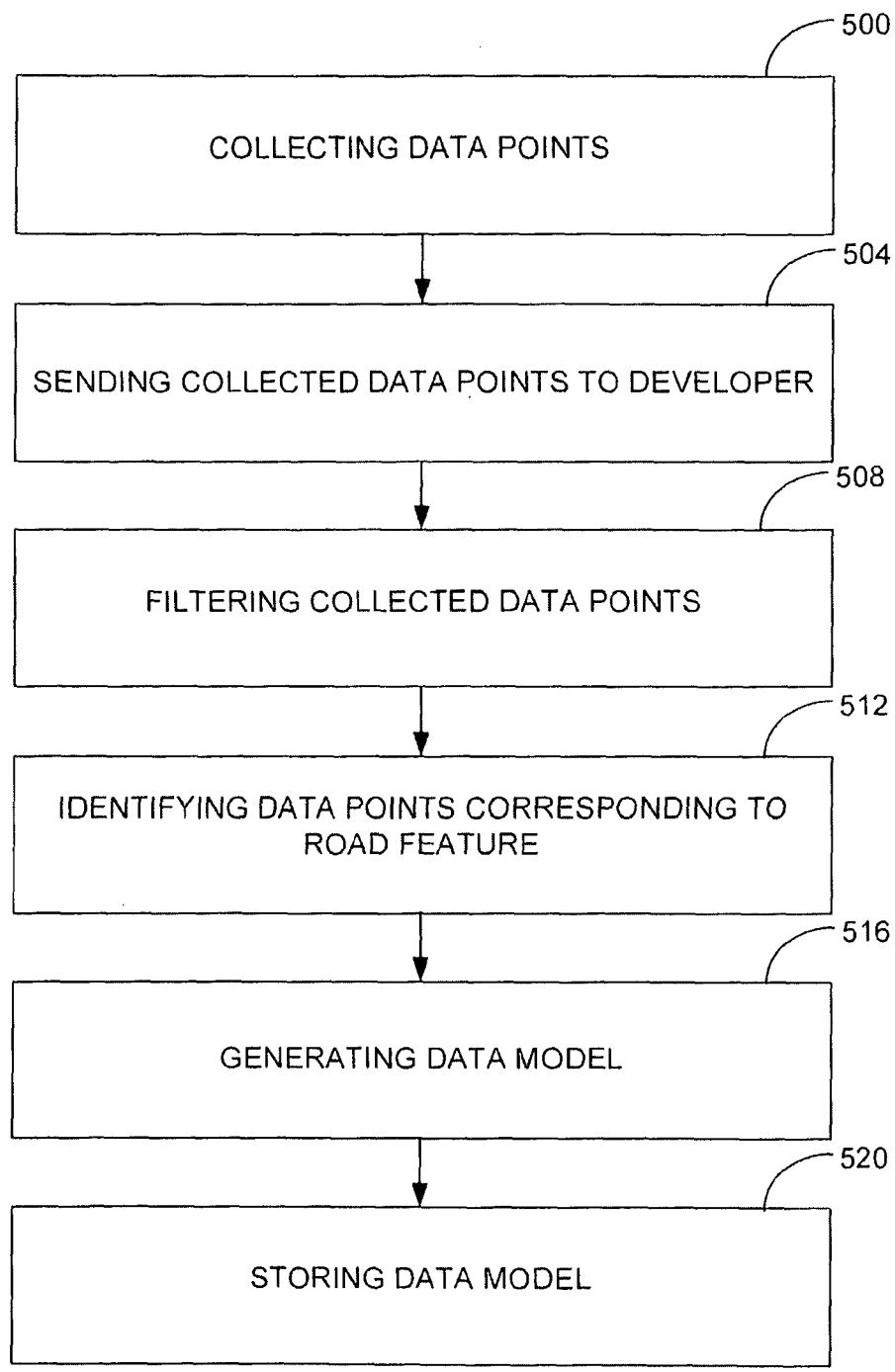
FIG. 5 is a flowchart of a method for determining geographic features corresponding to a travel path to develop a map database.

FIG. 5 is a flowchart of a method for determining geographic features, such as the road signs 304 or the lane markings 312, corresponding to a travel path, such as the road 308, to develop a map database, such as the geographic database 124. Fewer or more steps or acts may be provided, and a combination of steps may be provided. Also, the steps or acts may be performed in the order as shown or in a different order. The method is implemented by the system and/or devices described herein or by different devices or systems.

Data points, such as the data points 401, are collected (Step 500). For example, a map developer employs a driver to drive a vehicle, such as the object 108, on one or more roads to collect data to develop a map. In one embodiment, light data, such as LIDAR data, about a path or road are collected while on the path or road. Other data including positioning information or data, such a GPS data (e.g., latitude, longitude, and altitude) corresponding to the vehicle or data collection devices supported by the vehicle are collected. Imagery data, such as video or photographs, may also be collected. The other data or types of data may be collected at the same or different time than collecting the light data. In an alternate embodiment, instead of or in addition to driving or riding a vehicle to collect data points, a pedestrian may use a supporting device, such as the device 112 or 201, to collect the light data and/or other data. For example, a pedestrian carries or puts on a backpack or other transportation device (which may support the device 112 or 201) while walking on a path to collect data corresponding to the path.

The collected data points are sent to a map developer (Step 504). For example, while or after collection devices are gathering, receiving, or collecting data corresponding to a proximate travel path, the data is stored on one or more computer-readable media, such as the medium 116. In one embodiment, light data, such as the data points 401 are stored on a computer-readable medium, and other collected data are stored on different media. Alternatively, different types of collected data may be stored on the same computer-readable medium. The computer-readable media, such as a CD, DVD, flash drive, or hard drive, are delivered to an office or facility of the map developer. For example, after a vehicle is finished collecting data, it returns to a facility of the map developer. Or, the media may be mailed or sent by carrier to a certain office or facility. Alternatively, the collected data is transmitted to the map developer via a wireless or wired network. The media or collected data thereof is received by a processing device, such as the processing device 120. In one embodiment, the processing device converts the data points 401 into a global coordinate system (such as longitude, latitude, and altitude values and/or UTM) based on the collected GPS data.

The collected data is filtered as a function of retroreflectivity and/or a return intensity (Step 508). For example, the processing device is configured to filter the collected light data based on a retroreflectivity or return intensity threshold or value. If the transmitted energy for each laser pulse or scan is constant, then the return intensity value acts as an indicator of retroreflectivity. Alternatively, if the transmitting energy is dynamic and changes throughout a scan, then both the return intensity value and the corresponding transmitted intensity value may be compared to determine levels of retroreflectivity.

Figure 6:
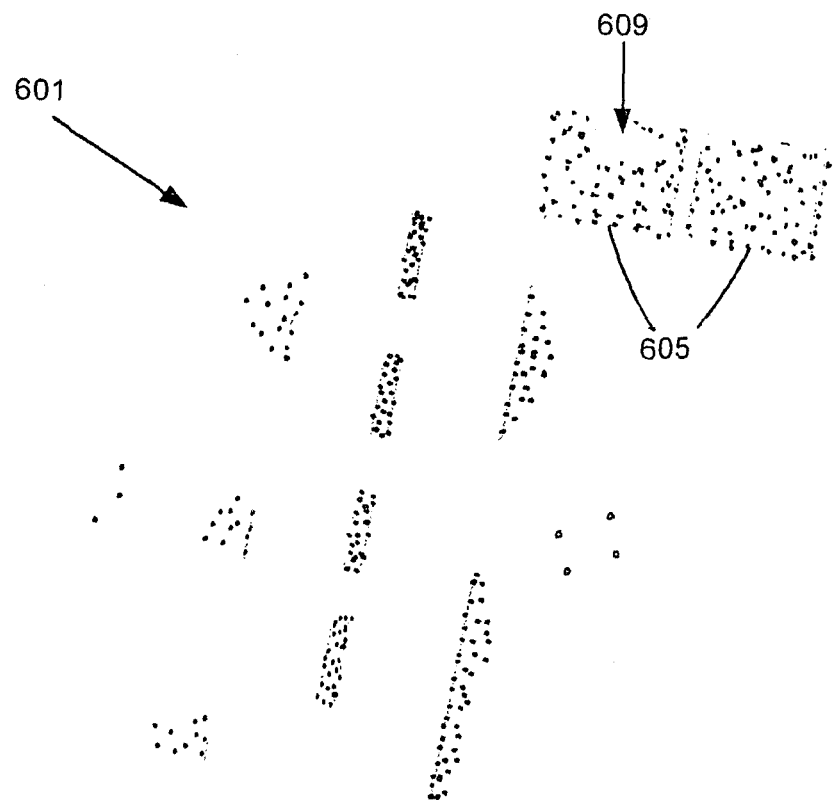
FIG. 6 illustrates an embodiment of filtered data from the collected data of FIG. 4.

FIG. 6 illustrates an embodiment of filtered data 601 from the collected data 401. In one embodiment, a return intensity value or threshold of at least about 220 is used to filter the collected data 401 to provide the filtered data 601. For example, data points having values less than about 220 are removed or discarded. Accordingly, the filtered data 601 correspond to data points that have return intensity values at or above 220. Other values or thresholds may be used. Also, for example, instead of or in addition to a global threshold, local thresholds may be used, such as for identifying different types of objects within the dataset or portions thereof. In one embodiment, some data points may be filtered or thresholded with a 220 value and other data points may be filtered with a 180 value. Filtered data 601 may have high return intensity values because objects in which the light is returning from may be retroreflective or treated with a retroreflective substance, such as the road signs 304 or the lane markings 312. Filtered data points 605 correspond to the road signs 304 or the retroreflective surface thereof (FIG. 3). The gap or portion 609 corresponds to the obstruction or debris 320, and the data points 401 representing the obstruction 320 have a lower return intensity value than the data points representing the retroreflective surface of the road signs 304. Accordingly, when the data points 401 are filtered based on the retroreflectivity threshold, the gap 609 occurs within the filtered data points 605 corresponding to one of the road signs 304.

Data points corresponding to one or more road features treated with retroreflective material, such as the road signs 304, are identified (Step 512). For example, after filtering the collected data points 401 based on retroreflectivity, the filtered data points 601 are further processed to identify data points representing or corresponding to road signs. In one embodiment, a KD-Tree data structure is built. The KD-Tree is used to search in neighborhoods of the filtered data points 601. Other data structures may be used for searching.

Filtered data points 601 are identified to be fitted to a plane. For example, for each point in the KD-Tree data set, all points within a radius, such as a radius of 0.5 meters or other distance, may be selected using a nearest neighbor search. Then a geometric plane is calculated that substantially fits the selected points the best using a linear least square method and/or other mathematical techniques. A normal vector that intersects the plane at about 90° is calculated. After finding the normal vector, the angle between that normal vector and the driving direction (the direction, line, or plane the vehicle or the object 108 is moving in) is calculated.

Figure 7:
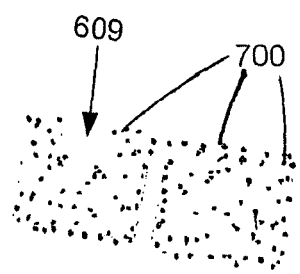
FIG. 7 illustrates an embodiment of data points after processing of the filtered data points of FIG. 6.

The filtered data points 601 are further filtered based on the angle calculated between normal vectors and the driving direction. For example, data points corresponding to a plane that is substantially normal to the driving direction may be more likely to be associated with road signs. Accordingly, data points that correspond to a plane that is not substantially normal to the driving direction are removed or filtered out. In one embodiment, instead of or in addition to choosing points with normal vectors that have a close to 1.0 dot product with the driving direction, points that have a substantially low dot product, such as less than about 0.05, with the other two axes may be selected (e.g., to give different tilting thresholds for each perpendicular axis). Accordingly, flexibility of tilt (such as tilting of a sign) along a particular direction may be considered. FIG. 7 illustrates an embodiment of data points 700 and 704 after processing of the filtered data points 601. The data points 700 and 704 are remaining data points after filtering the data set based on calculated angles or normal vectors relative to the driving direction. The data points 700 correspond to road signs, such as the road signs 304, and the data points 704 are outlier data points.

Figure 8:
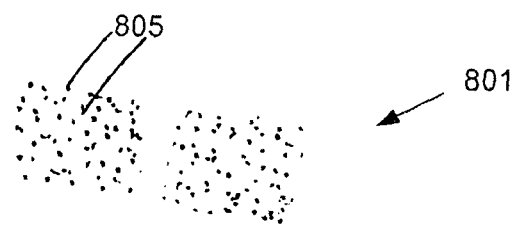
FIG. 8 illustrates an embodiment of data points after additional processing.

Noise and/or outlier data points, such as the data points 704, may be filtered out or removed by a neighborhood search. For example, data points that have less than a certain amount of neighborhood points, such as less than about 20, within a specific radius, such as 0.25 meters, may be deleted. FIG. 8 illustrates an embodiment of data points 801 after additional processing in which the outlier or noise data points 704 of FIG. 7 have been removed.

Furthermore, FIG. 8 shows data points 805 that have filled in a gap corresponding to the gap or portion 609. As mentioned earlier, the gap 609 may occur due to weathering conditions or other factors. To address such gaps, a region growing algorithm may be used. For example, the original data points 401 (FIG. 4) may be used to find data points that fill in or fall within the gap 609 on the plane corresponding to the data points 700, such as the identified cluster of filtered data points associated with the gap 609. A least square fitting algorithm may be used. For example, one or more seed points may be selected to model a line or plane, and then other points corresponding to the line or plane are identified and act as further seed points and so on. The growing or identifying of points may be limited or terminated based on distance factors, such as distance between points. Also, an angle or change relative to the line or plane may be used to terminate or stop the incorporation of data points. Other factors, such as symmetry, size, and shape may also be considered. Alternatively, other growing techniques may be used.

Accordingly, the data points 801 are identified data points that correspond to road signs, such as the road signs 304. In this embodiment, for example, the data points 801 were identified without using corresponding video imagery. Alternatively, video imagery may be used for verification and/or editing.

If the data points 601 include high levels of noise or a substantial amount of noisy data, techniques may be used in addition to or instead of the techniques mentioned above to identify data points corresponding to the road signs. For example, the return intensity values of the data points 601 (or alternatively the data points 401) may be plotted over a time axis. Certain periods of time corresponding to light sensors receiving higher amounts of energy, such as when light is retroreflected from a road sign, will indicate peaks of return intensity such as in a histogram format. In one embodiment, the data points 601 that correspond to a return intensity peak are focused on for further analysis. For example, a plane is substantially fitted to the data points 601 corresponding to an intensity peak, such as using Random Sample Consensus ("RANSAC") or other techniques. The plane may be analyzed to determine if it is substantially normal to the driving direction, which may indicate that the data points correspond to one or more road signs.

If the plane is determined to be acceptable, then a grid or mesh is applied over the data points in the plane. Based on the number of data points in each cell of the grid or mesh, a "1" or "0" or an "on" or "off" or other binary value is associated with the cells. For example, a "1" may correspond to a relatively high number of data points in a cell while a "0" may correspond to a relatively low number of data points in a cell. The binary assignments are used to determine whether multiple or separate objects, such as separate road signs, exist. Other clustering techniques may be used. Separate planes may be fitted to separate clusters, such as via a RANSAC technique, to further identify or determine separate road features, such as road signs. Also, triangulation methods may be used to determine if the data points correspond to one road sign or separate road signs based on geometry, symmetry, and/or other factors. Triangulation may also be used in conjunction with the original data set 401 to fill in a gap, such as the gap 609.

Figure 9:
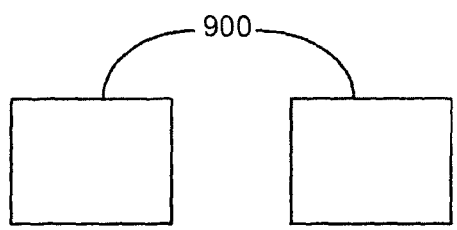
FIG. 9 illustrates geometric shapes corresponding to identified data points.

A data model is generated based on the identified data points 801 (Step 516). For example, boundaries of the identified points 801 may be determined. In one embodiment, the data points 801 are projected onto a 2D plane. The outer points of the projected 2D data set may be traced to determine a boundary, such as using convex hull techniques or other techniques. For example, the projected 2D data are triangulated and the boundary edges are kept. This set of boundary edges then form the "alpha shape" of the 2D point set, which can be used to query a sign database. After the boundary is determined, the data points may or may not be returned back to 3D space for further modeling. A geometric shape then may be fitted to the determined boundary. For example, road signs correspond to a set of shapes, such as a rectangle, a triangle, a circle, a hexagon, an octagon, or other geometric shapes. FIG. 9 illustrates geometric shapes 900 corresponding to the identified data points 801. For example, the geometric shapes 900 are mathematical models corresponding to a shape and/or relative size of the road signs 304. Characteristics other than shape may also be used to develop the data model. For example, color, text, and/or other information may be associated with the data model. Color and text data may be determined from video or photographs of the road signs 304. For example, the identified data points 801 or a shape or boundary thereof may be matched with collected video, camera, and/or imagery data.

The generated data model is then stored, such as in the map database 124, (Step 520). For example, the generated data model may be stored in a road segment record that represents that real-world portion of the road that includes the road signs 304. Accordingly, the generated data model may be an attribute associated with a road segment and is used for map display, map guidance, and/or other navigation related features. Alternatively, the generated data model may be stored separately from road segment or node records (e.g., an index may be used to associate or link generated data models with appropriate nodes and/or road or path segments). Also, the generated data models may be stored in a database separate from the map database 124.

Figure 10:
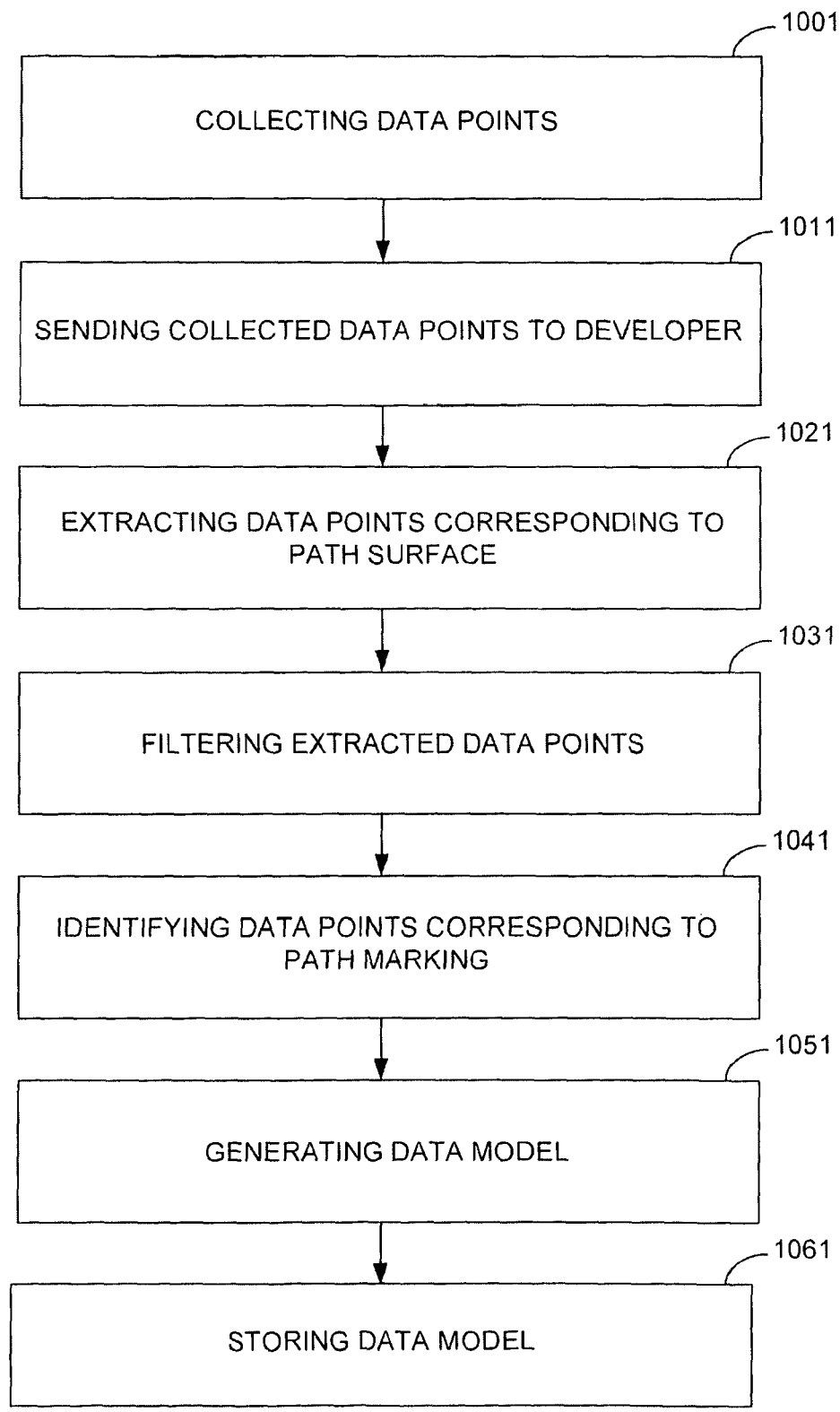
FIG. 10 is a flowchart of a method for determining a geographic feature on a travel path to develop a map database.

FIG. 10 is a flowchart of a method for determining a geographic feature, such as the lane markings 312, on a travel path, such as the road 308, to develop a map database, such as the geographic database 124. Fewer or more steps or acts may be provided, and a combination of steps may be provided. Also, the steps or acts may be performed in the order as shown or in a different order. The method is implemented by the system and/or devices described herein or by different devices or systems.

Light data points, such as the data points 401, are collected (Step 1001). The collection of the light data points may be similar to the collection of data points described in Step 500 above. The collected data points are then sent to a map developer (Step 1011). The methods of sending the collected data points to the map developer may be similar to method described in Step 504 above.

Figure 11:
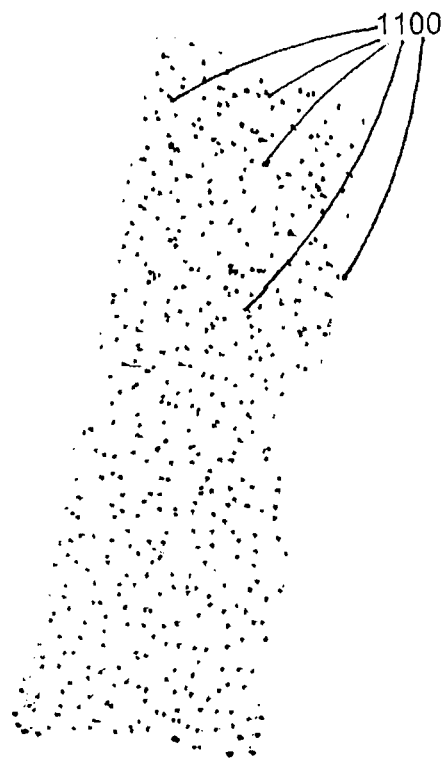
FIG. 11 illustrates an embodiment of extracted data from the collected data of FIG. 4.

Referring to FIG. 11, data points 1100 corresponding to a path surface, such as a path surface of the road 308, are extracted from the collected data 401 (Step 1021). For example, an average ground elevation, e0, is estimated or calculated from the light source, such as one or more lasers, striking the ground. Equation (1) models the average ground elevation, e0.

$$e0 = \frac{\sum_{|i-ang|<\varepsilon} ei}{n} \quad (1)$$

For example, a specific angle range, ϵ, is estimated to be a range in which the lasers are actually pointing and striking the ground or surface of the road 308. In one embodiment, ϵ may be about 10° or other degree range. The symbol i corresponds to a particular data point, n corresponds to a total number of points, ang corresponds to a rotation angle pointing to the ground perpendicularly, and ei corresponds to an elevation of a particular data point. Based on equation (1), an average ground elevation is determined. Alternatively, other models or equations may be used to calculate an average ground elevation.

All data points 401 that are a certain distance, such as 0.25 meters, above or below the average ground elevation are discarded as non-ground points. Then, left and right boundaries or borders are identified. For example, for each scan line of the light source, such as a LIDAR scanner, the first abrupt change of elevation from the center to the left is determined and then a second abrupt change from the center to the right is determined. An abrupt change may correspond to a local standard deviation, such as three times the standard deviation from the average ground elevation. The abrupt changes may represent grass, a barrier, a railing, a curb, rocks, or other features on sides of roads or paths. All data points beyond the first and second abrupt change points are discarded as non-road points, and, accordingly, the data points 1100 remain. Also, a width of the path or road and/or individual lanes may be determined from the mentioned techniques.

Figure 12:
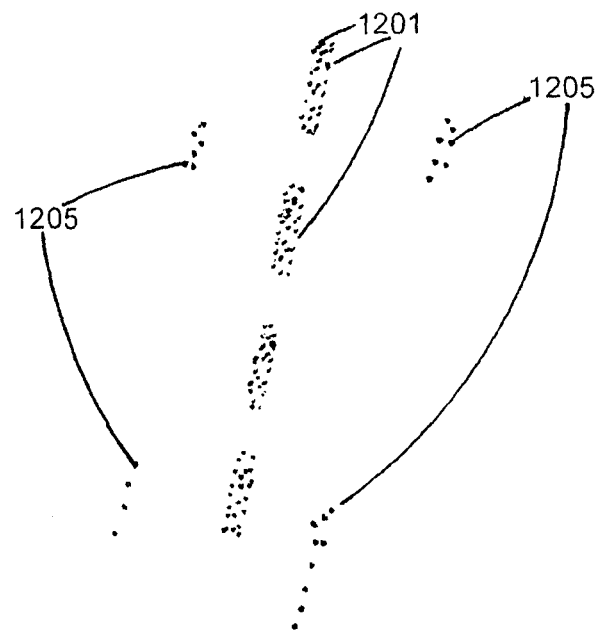
FIG. 12 illustrates an embodiment of filtered data from the extracted data of FIG. 11.

The extracted data points 1100 are filtered as a function of retroreflectivity or return intensity (Step 1031). For example, a return intensity value, such as 100, is selected to filter the extracted data. Other values or thresholds may be used. FIG. 12 illustrates an embodiment of filtered data 1201 and 1205 from the extracted data 1100. Accordingly, the filtered data 1201 and 1205 correspond to data points that have return intensity values at or above 100. The filtered data may have high return intensity values because objects in which the light is returning may be retroreflective or treated with a retroreflective substance, such as the lane markings 312. For example, the filtered data points 1201 correspond to the lane markings 312 or the retroreflective surface thereof (FIG. 3). Outlier or noise data points, such as the data points 1205, may be removed using neighborhood search techniques, as mention above in Step 512, or other techniques.

Figure 13:
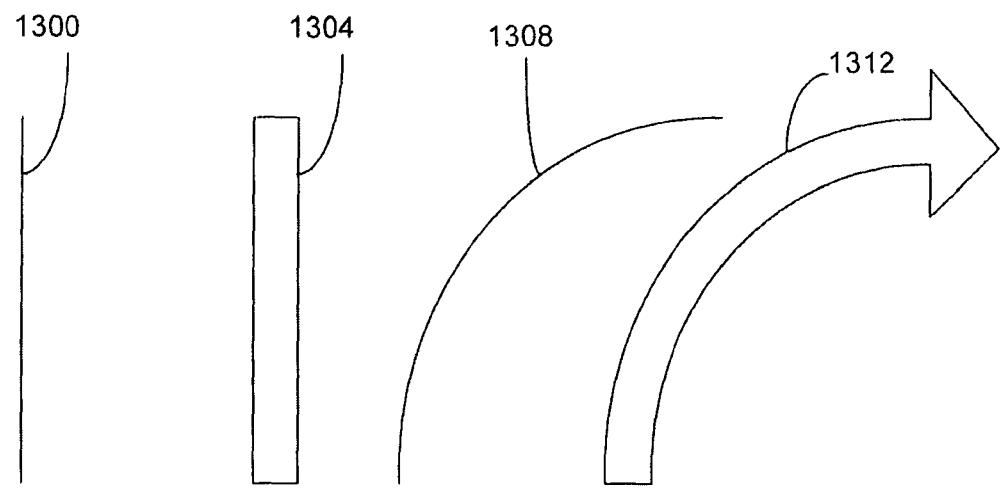
FIG. 13 illustrates examples of data models corresponding to identified data points.

Data points, such as the data points 1201, corresponding to a path marking, such as the lane markings 312, are identified (Step 1041). For example, clustering of data points using a Hough transform or other method may be used to identify or determine groupings of data points 1201 that correspond to separate path or lane markings. A data model is generated based on the identified data points 1201 (Step 1051). For example, line fitting, curve fitting, and/or other shape fitting algorithms may be used to model lane markings. FIG. 13 illustrates data models corresponding to the identified data points. For example, the identified data points 1201 may correspond to center lane markings, such as the lane markings 312, and, accordingly, a line 1300 and/or a rectangle 1304 may be mathematically modeled to represent each of the center lane markings. Other data models, such as the models 1308 and 1312, may be generated to model other types of lane markings, such as turn markings, side lane markings, restriction markings, curb markings, description markings, or other markings on a path or a road. Characteristics other than shape and/or relative size may also be used to develop the data model. For example, color, text, and/or other information may be associated with the data model. Color and text data may be determined from video or photographs of the lane markings 312.

The generated data model is then stored, such as in the map database 124, (Step 1061). For example, the generated data model may be stored in a road segment record that represents that real-world portion of the road that includes the road signs 304. Accordingly, the generated data model may be an attribute associated with a path or road segment and is used for map display, map guidance, and/or other navigation related features. Alternatively, the generated data model may be stored separately from path/road segment or node records (e.g., an index may be used to associate or link generated data models with appropriate nodes and/or segments). Also, the generated data models may be stored in a database separate from the map database 124.

The different steps, acts, or processes of the methods described above may be mixed and matched. Also, the methods mentioned above may be implemented by a computer application used in the processing device or associated device.

Alternatives

As mentioned above, the processing of the collected data may occur in a processing device at a map developer facility. Alternatively, some or all of the processing of the collected data may occur in the object collecting the data or components thereof, such as the vehicle or collection devices supporting the vehicle. For example, a computer in the vehicle may process collected data to identify data points corresponding to road features and model the road features. Semi-processed data and/or data models may then be sent to or transmitted to the map developer for further processing and/or storage in the map database.

As described above, the data models are stored in a map database and may be used for navigation related functions or services. However, the generated or determined data models may also be used for other applications. For example, the data models may be used for video games, virtual reality applications, computer graphics programs, city modeling and/or other map, geographic, or location based applications.

In another alternate embodiment, instead of or in addition to using the light data collection devices and other collection devices mentioned above, an infrared camera may be used to identify retroreflective road features. For example, some spectrums, such as a near-infrared spectrum, are more sensitive to retroreflective markings or signs than the visible domain. Accordingly, near-infrared cameras, such as video cameras and/or still photograph cameras, may be used to collect images or photographs of areas and road features about a road or path. Cold infrared cameras (that use a light source rather than heat generated from an object to generate an image) may be used. Road or path signs and path markings may be extracted and modeled more easily from images of the near-infrared cameras, and collection of image data at night may advantageously assist map developer operations.

The logic, software, or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

The invention claimed is:

1. A method comprising:
receiving reflected light data points collected at a light detection and ranging device;
identifying, by a processor, an energy level of the reflected light data points;
calculating, by the processor, a ratio of the energy level of the reflected light data points to an emitted energy level of the light detection and ranging device;
identifying a subset of the reflected light data points with energy levels that exceed a first return intensity ratio and are less than a second return intensity ratio; and
identifying a predetermined shape data model that corresponds to the subset of the reflected light data points.

2. The method of claim 1, wherein the predetermined shape model is selected from a group of lane markings including at least one of turn markings, side lane markings, restriction markings, or curb markings.

3. The method of claim 1, wherein the predetermined shape model includes a lane marking size.

4. The method of claim 1, wherein the predetermined shape model includes a lane marking color.

5. The method of claim 1, wherein the light detection and ranging device uses a near infrared spectrum.

6. The method of claim 1, wherein the first return intensity ratio comprises a global ratio and a local ratio.

7. The method of claim 1, further comprising:
applying a growing algorithm to the subset of the reflected light data points to eliminate gaps.

8. The method of claim 1, further comprising:
applying a grid of cells to the reflected light data points; and
determining a binary label for each of the cells of the grid.

9. The method of claim 1, further comprising:
scanning the light detection and ranging device in a first direction;
identifying an initial abrupt change in the reflected light data points in the first direction;
scanning the light detection and ranging device in a second direction;
identifying a second abrupt change in the reflected light data points in the second direction; and
discarding points before the initial abrupt change in the first direction and points before the second abrupt change in the second direction.

10. An apparatus comprising:
at least one processor; and
at least one memory including computer program code for one or more programs, the at least one memory and the computer program code configured to, with the at least one processor, cause the apparatus to perform at least the following:
calculate a ratio of an energy level of reflected light data points to an emitted energy level of a light collection device;
identify a subset of the reflected light data points that exceed a first ratio threshold and are less than a second ratio threshold, wherein the first and second ratio thresholds are a function of retroreflectivity;
identify a predetermined shape data model that corresponds to the subset of the reflected light data points; and
store, in a map database, the predetermined shape data model that corresponds to the subset of the reflected light data points at a travel path associated with the reflected light data points.

11. The apparatus of claim 10, wherein the at least one memory and the computer program code configured to, with the at least one processor, cause the apparatus to:
calculate an average ground elevation of the travel path; and
discard reflected light points more than a predetermined distance from the average ground elevation.

12. The apparatus of claim 11, wherein the at least one memory and the computer program code configured to, with the at least one processor, cause the apparatus to:
identify borders of the travel path based on the average ground elevation.

13. The apparatus of claim 10, wherein the at least one memory and the computer program code configured to, with the at least one processor, cause the apparatus to:
determine whether emitted energy is substantially constant through a scan of the light collection device, wherein the subset of the reflected light data points are substantially constant and exceed a first ratio threshold and are less than a second ratio threshold.

14. The apparatus of claim 10, wherein the predetermined shape model is selected from a group of lane markings including turn markings, side lane markings, and restriction markings.

15. The apparatus of claim 10, wherein the at least one memory and the computer program code configured to, with the at least one processor, cause the apparatus to:
scan the light collection device in a first direction;
identify an initial abrupt change in the reflected light data points in the first direction;
scan the light collection device in a second direction;
identify a second abrupt change in the reflected light data points in the second direction; and
discard points before the initial abrupt change in the first direction and points before the second abrupt change in the second direction.

16. The apparatus of claim 15, wherein the abrupt change deviates from an average value by a predetermined number of standard deviations.

17. A method comprising:
receiving position data for a device;
accessing a map database based on the position data; and
receiving a travel path image including a predetermined shape data model for a lane marking that corresponds to a first subset of reflected data points identified from a comparison of emitted energy and reflected energy light data points which exceed a first ratio threshold and are less than a second ratio threshold, wherein the light data points are collected by a light detection and ranging device.

18. The method of claim 17, wherein the predetermined shape model is selected from a group of lane markings including turn markings, side lane markings, and restriction markings.

19. The method of claim 1, wherein the first return intensity ratio ratio is a function of a retroreflectivity of a lane marking.

20. The method of claim 19, wherein the second return intensity ratio is a function of a retroreflectivity of a traffic sign.

* * * * *